US006793136B2

(12) United States Patent
Wells et al.

(10) Patent No.: US 6,793,136 B2

(45) Date of Patent: Sep. 21, 2004

(54) IN-LINE VERIFICATION, REPORTING AND TRACKING APPARATUS AND METHOD FOR MAIL PIECES

(75) Inventors: Thomas R. Wells, Crystal Lake, IL (US); Richard Wojdyla, Wadsworth, IL (US)

(73) Assignee: Bell Bowe & Howell Postal Systems Company, Lincolnwood, IL (US)

(*) Notice: Subject to any disclaimer, the term of this patent is extended or adjusted under 35 U.S.C. 154(b) by 0 days.

(21) Appl. No.: 10/351,409

(22) Filed: Jan. 27, 2003

(65) Prior Publication Data

US 2003/0111524 A1 Jun. 19, 2003

Related U.S. Application Data

(63) Continuation of application No. 09/774,432, filed on Jan. 30, 2001, now Pat. No. 6,510,992.

(60) Provisional application No. 60/179,854, filed on Feb. 2, 2000.

(51) Int. Cl.[7] .................................................. G06F 17/60

(52) U.S. Cl. ........................................ 235/385; 235/375

(58) Field of Search ................................ 235/385, 375, 235/379, 494, 432, 380; 705/1, 401, 407, 406, 408, 62

(56) References Cited

U.S. PATENT DOCUMENTS

| | | | | |
|---|---|---|---|---|
| 4,999,481 A | | 3/1991 | Baer et al. | 235/375 |
| 5,043,908 A | | 8/1991 | Manduley et al. | 198/349.6 |
| 5,420,403 A | | 5/1995 | Allum et al. | 209/584 |
| 5,612,889 A | | 3/1997 | Pintsov et al. | 700/226 |
| 5,731,574 A | | 3/1998 | Bodie et al. | 235/375 |
| 5,936,865 A | | 8/1999 | Pintsov et al. | 700/107 |
| 6,005,945 A | | 12/1999 | Whitehouse | 380/51 |
| 6,311,892 B1 | | 11/2001 | O'Callaghan et al. | 209/584 |
| 6,385,504 B1 | | 5/2002 | Pitsov et al. | 700/102 |
| 6,386,451 B1 | | 5/2002 | Sehr | 235/384 |
| 6,427,021 B1 | | 7/2002 | Fischer et al. | 382/101 |
| 6,442,525 B1 | | 8/2002 | Silverbrook et al. | 705/1 |
| 6,510,992 B2 | * | 1/2003 | Wells et al. | 235/385 |
| 6,651,878 B2 | * | 11/2003 | Malatesta et al. | 235/375 |
| 2002/0073040 A1 | | 8/2001 | Schwartz et al. | 705/62 |
| 2001/0032881 A1 | * | 10/2001 | Wells et al. | 235/385 |
| 2002/0120668 A1 | | 8/2002 | Pinstov et al. | 709/200 |
| 2003/0014376 A1 | * | 1/2003 | DeWitt et al. | 705/406 |
| 2003/0106932 A1 | * | 6/2003 | Malatesta et al. | 235/375 |
| 2003/0111524 A1 | * | 6/2003 | Wells et al. | 235/375 |

* cited by examiner

*Primary Examiner*—Thien M. Le

(74) *Attorney, Agent, or Firm*—McDermott Will & Emery LLP

(57) ABSTRACT

An apparatus for automatically acquiring and verifying, relative to pre-established rules, address information and postage value indicia on a face of each of a plurality of mail pieces. The mail pieces can be subsequently placed in a tray and a label is applied to the tray, the label imprinted with information which relates to the mail piece content of the tray. The apparatus includes an inserter adapted to insert documents into an envelope and seal the envelope to produce a finished mail piece or a sorter which conveys finished mail pieces, with the address information and postage value indicia visible on a face of each mail piece. An in-line module is disposed adjacent the inserter, the module including a path along which each finished mail piece is transported. The module includes a scale and an image capture device, the scale adapted to measure and record the weight or mass of each finished mail piece, and the image capture device adapted to capture an image of the address information on the face of each finished mail piece. A scanning device can be provided to acquire a representation of the information on the tray label. The scale, image capture device and, optionally, scanning device are electronically linked to a control processor device for controlling acquisition, storage and verification of the address information and postage value indicia on the finished mail piece and the information on the label. An image processing device is provided in communication with the control processor device, and is adapted to synchronize acquisition, storage and verification of the address information, postage value indicia and label information.

20 Claims, 6 Drawing Sheets

IN-LINE VERIFICATION, REPORTING AND TRACKING APPARATUS AND METHOD FOR MAIL PIECES

This application is a continuation of Ser. No. 09/774,432 filed Jan. 30, 2001, now U.S. Pat. No. 6,510,992; which claims benefit of U.S. provisional application No. 60/179,854 filed Feb. 2, 2000.

The present invention relates generally to an apparatus and method for utilizing electronic information and electronic messaging markets to increase the efficiency in the handling and delivery of mail pieces. In particular, the present invention provides an automated electronic verification system operative at the point of creation of a mail piece, with electronic connections through the Internet or a dedicated intranet to permit customer tracking of mail pieces, data exchange between the Postal service, mass mailers and their customers, and electronic postage reporting and payment. Additionally, enhanced transportation planning and distribution of the mail is provided by the present invention.

BACKGROUND OF THE INVENTION

A large volume of mail today is produced and/or prepared for distribution and delivery to a customer delivery point by mass producers or mailers, such as banks, credit card management companies, billing departments of retail establishments and mass mailing advertisers, to name a few. Postage discounts are given by the Postal Service to large mailers, who in turn are required pursuant to established rules, to properly address and barcode each mail piece, sort and tray the mail pieces in sequence according to ZIP code, and label each tray as to destination, postage paid, weight, and other information. At present, the U.S. Postal Service has approximately 4,000 employees engaged in the manual verification of mail at 3,500 Business Mail Entry Units (BMEU's) located in postal facilities, and 800 Detached Mail Units located at various mailers' facilities who produce large volume mailings. These employees, or acceptance clerks, manually verify mailings for piece counts, present makeup, barcode quality and proper postage, to ensure the mailer is entitled to the postage discount it claims. Failure to follow these procedures can result in major revenue losses to the Postal Service, and these manual verification procedures are time consuming, costly, and lead to error. As a result, there is a need to automate the manual verification process utilized by the Postal Service, and by large mailers, and to account for every mail piece produced on a host mail production machine, such as an inserter.

One such solution is the Automatic Verification Equipment disclosed in U.S. patent application Ser. No. 08/909,640 titled "Automatic Verification Equipment", which application is commonly assigned, and which disclosure is incorporated by reference as if set forth herein. The Automatic Verification Equipment of that application is a stand-alone verification unit that weighs sample quantities of bulk mail, captures an image of all address and postage information on each piece of sampled mail, scans a barcode on the tray label submitted by the mailer, and issues a report as to the accuracy of the relevant information submitted by the mailer to support qualification for postage discounts. The Automatic Verification Equipment performs its operation on each mailpiece in one or more randomly selected trays of mail, which are representative of a larger bulk shipment of same or similar mail pieces.

It has been found desirable to provide a system which instead of verifying randomly selected mail piece quantities, verifies the correct postage and address information on each mail piece produced, as well as provide electronic payment of postage, electronic status and tracking of each mailpiece, and provide ease of transportation planning for large productions of bulk mail, either letter mail or flat mail. The present invention performs these functions by weighing each mail piece, and capturing the image of the address information and postage value indicia on, every finished mail piece produced within a mailer's facility. This total verification of each mail piece enhances the revenue protection of the Postal Service.

In one embodiment, the present invention captures, analyzes, stores and retrieves data pertaining to the weight, delivery point address and postage visible on a face of a mail piece. This data is used to automatically perform mail verification and acceptance processes heretofore performed manually by Postal Service personnel.

In an additional embodiment of the present invention, an automatic weight and image capture system, such as described in the above-mentioned commonly assigned patent application, is connected as a client via a local area network (LAN) to a central server which processes incoming image and weight data, and performs required verification, analysis, diagnostic, reconciliation, data storage, data retrieval and communication functions. Data passed from the automatic weight and image capture system to the central server includes: mail piece image data, mail piece weight, image capture timestamp and the weight and image capture system unique identification number, when provided.

The central server of the present invention maintains a database at the mail piece level containing discreet information relating to each mail piece as to requirements and rules to be followed which are embedded in the system software. The central server also interfaces with the mailer's computer system(s) used in the generation of the mail pieces, and also provides controlled remote access to Postal Service and manufacturer representatives for diagnostics, data retrieval, software downloads or other designated purposes.

The present system will permit earlier pickup of mailings, in some cases allowing mail to be delivered by road on trucks, rather than by more expensive air transportation. The system of the present invention generates real time mailing data that improves plan loading requirements at the point where the mail is generated. By using the presently disclosed apparatus and method, shipments of large quantities of bulk mail can by-pass local Processing and Distribution Centers (P&DC) maintained in many locations by the Postal Service. Instead, the mail is capable of delivery directly from a mail piece preparation house to a regional or local Post Office for carrier distribution to customer delivery points serviced by that Post Office. Likewise, mail bypasses the Bulk Mail Entry Units (BMEU) since the accuracy of postage data and address information is totally verified at the point of creation of a mail piece.

The present invention also provides the ability for a large mailer to link into the planet code system established by the Postal Service, for example allowing the mailer to track outgoing mail pieces so that the sender of the mail piece can know where that mail piece is, or to track the payment (or non-payment) of invoices by return mail. The planet code is a revised bar code applied to outgoing mail pieces and/or to return envelopes. In one embodiment of the use of the planet code technology, once a return envelope has been mailed and reaches a P&DC operated by the Postal Service, the sortation equipment at the P&DC will read the planet code, and store the information in a database reflecting the entry of that payment envelope into the mail system. The creator of the invoice to which the payment is responsive will have access through the Internet, or through a Postal Service intranet, to that portion of the database containing information solely for that mailer's access. This enables the mailer to plan the receipt of revenues, and to send out dunning letters faster if the sortation system at the P&DC shows that a payment envelope has not been processed at the P&DC by the date a payment was scheduled. The present invention is the vehicle whereby the outgoing mail can be tracked. This is only one example of the use of planet code technology in association with the total tracking system of mail pieces offered by the present invention.

The present invention also permits the automatic preparation of Postage Summary Reports and reconciliation of these reports to actual physical mailing. This ensures correct postage payments. Additionally, by placing the presently disclosed mail piece weighing and image capture module adjacent the point of completion of each mail piece, mailers have the opportunity to monitor their mailing production process and make corrective actions during the mail's production if necessary, without waiting until after the mailing production is completed. The present invention also allows complete mail tracking from creation to delivery.

SUMMARY OF THE INVENTION

The above and other objects are provided by the present invention, which in one embodiment comprises a mail piece weighing and image capture module disposed in the transport stream of mail pieces, which mail pieces are completed by known inserting apparatus, or similarly known devices, with address information and postage value indicia visible on a face of each mail piece. The weighing and image capture module of the present invention is disposed at or near the point of completion of each mail piece, such that each mail piece traverses the module before being placed in standard or modified mail trays for shipment to a prescribed destination for processing and ultimate delivery to a mail consumer. As each mail piece traverses the weighing and image capture module, the weight of the mail piece is measured and recorded electronically in the database maintained at the mailer's facility. The image capture device than electronically captures an image of all address information and postage value indicia appearing on the face of each mail piece. This image is digitized and stored in the database as a digital image. According to Postal Service rules and regulations, each mail piece to qualify for a bulk rate discount must display address information and postage value indicia in certain pre-defined areas or sectors of each mailpiece. The computer program operating the mail piece processing system can discern and identify alpha-numeric address information, postage value indicia, barcodes, sort level codes and other data appearing on each mail piece. Non-conforming mail pieces may be rejected and either re-processed or not given postage discounts.

The present invention compares the weight and postage indicia data on each envelope to rules embedded in the operating system of the disclosed apparatus, and the apparatus performs a verification process to ensure that each mail piece conforms to the establish rules. If the verification process is positive, the mail pieces are placed in trays, and the trays are placed on pallets in the disclosed embodiment. The pallets of trays are placed on trucks for delivery to local postal facilities for final sortation and delivery to the consumer. The data stored in the mailer's database is accessible to the Postal Service, which obtains verification of the proper postage on each mail piece, and can track the progress of each mail piece through the distribution system. The mailer also has the ability to track the delivery progress of its mail pieces, and to obtain additional or replacement postage from the Postal Service by the electronic transfer of funds from the mailer to the Postal Service.

The purpose of the disclosed invention is to improve the electronic connection between business mailers and the Postal Service, that provides a window to mailing information and verification at the point of mail creation on mail insertion systems. The present invention contemplates the installation of a module having an image capture system, a weighing system, and a graphical user interface allowing the module to gather information about each mail piece. This information will be furnished to a central computer which will process the information according to mailing rules associated with the class of mailing and discounts taken for the mailing. The verification system is networked to a mainframe so that the mailing Postage Summary Reports (PSR) are reconciled to the actual mailing created by the inserting equipment. Differences between the mainframe postage reports and the verification modules are reported to the mailer and to the Postal Service for correction. The central computer sends the information, which includes a MAIL.DAT file, for each completed mailing via the Internet to the Postal Service Prompt Payment Processing Center.

The central computer can interface with a tray management system which provides tray content verification by comparing actual weight of the tray to the expected weight of the tray. Under the present invention, tray label quality can also be determined and corrections reported through the central computer. Dispatching information and tray label identification information can be determined and communicated to the Postal Service Dispatching as well as through the central computer.

Other objects and advantages of the subject invention will be apparent to those skilled in the art from consideration of the attached drawings and the detailed description of the illustrated embodiments.

DETAILED DESCRIPTION OF THE ILLUSTRATED EMBODIMENT

Figure 1:
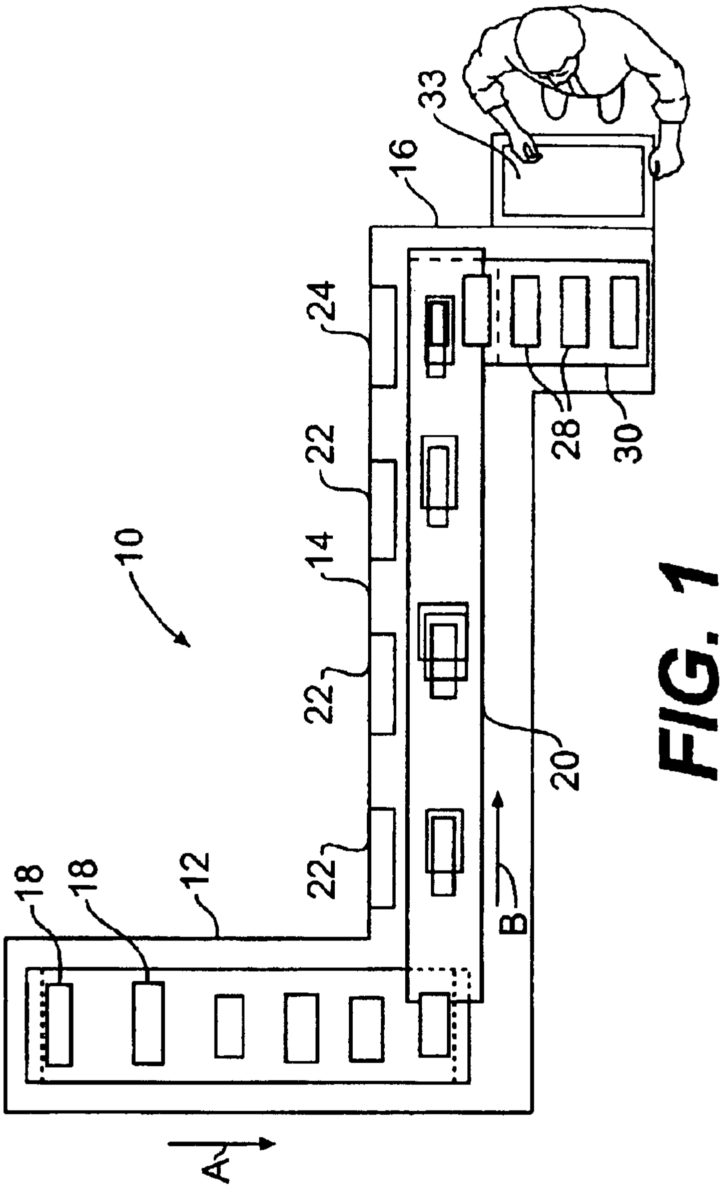
FIG. 1 is a plan schematic view of a mail piece inserter apparatus in accordance with the teachings of the prior art.

Referring to FIG. 1, insertion machine 10 is shown in a schematic view, including infeed conveyor 12, insertion section 14, and traying conveyor section 16, as is known in the art. Documents 18 such as billing invoices, statements, correspondence or the like are advanced along infeed conveyor 12 in the direction shown by the arrow A towards an insertion conveyor 20. Upon being transferred to insertion conveyor 20, each document incrementally and sequentially passes adjacent a plurality of insert stations 22, where additional items such as advertising pieces, return payment envelopes, additional correspondence or the like, are lodged one on top of the other, and on top of each passing document 18. In one embodiment, the return payment envelope may be imprinted with a barcode, or planet code, indicating the name and/or address of the recipient of invoice document 18, the due date for return payment, and other encoded information that will allow tracking of the return payment envelope once mailed by the recipient of the invoice.

The individual stacks of documents 18 and inserts from stations 22 are advanced by insertion conveyor 20 in the direction shown by arrow B until they reach envelope station 24, where each stack of documents is automatically inserted in a mailing envelope 26, and the envelope 26, and the envelope is sealed. The envelope 26 may contain an open or glassine window through which mailing address information imprinted on document 18, including barcode and sort level information, is displayed. Alternatively, address information, barcode and sort level data may be imprinted directly on the envelope 26. The present invention contemplates that address information of the recipient of the envelope 26 be visible on a face of the envelope, as well as postal value indicia which can be pre-printed on each envelope 26 based upon pre-determined estimated postage amounts for the type and weight of mailing, and the discount desired to be obtained, and supported by the mailer.

The finished mail pieces 28 in the prior art device shown in FIG. 1 are then transferred to a traying conveyor 30 where they are manually removed and placed in a standard mail tray 33. The tray and its contents are then advanced through the Postal Service system to the ultimate delivery point and the consumer, as is known is the art.

Figure 2:
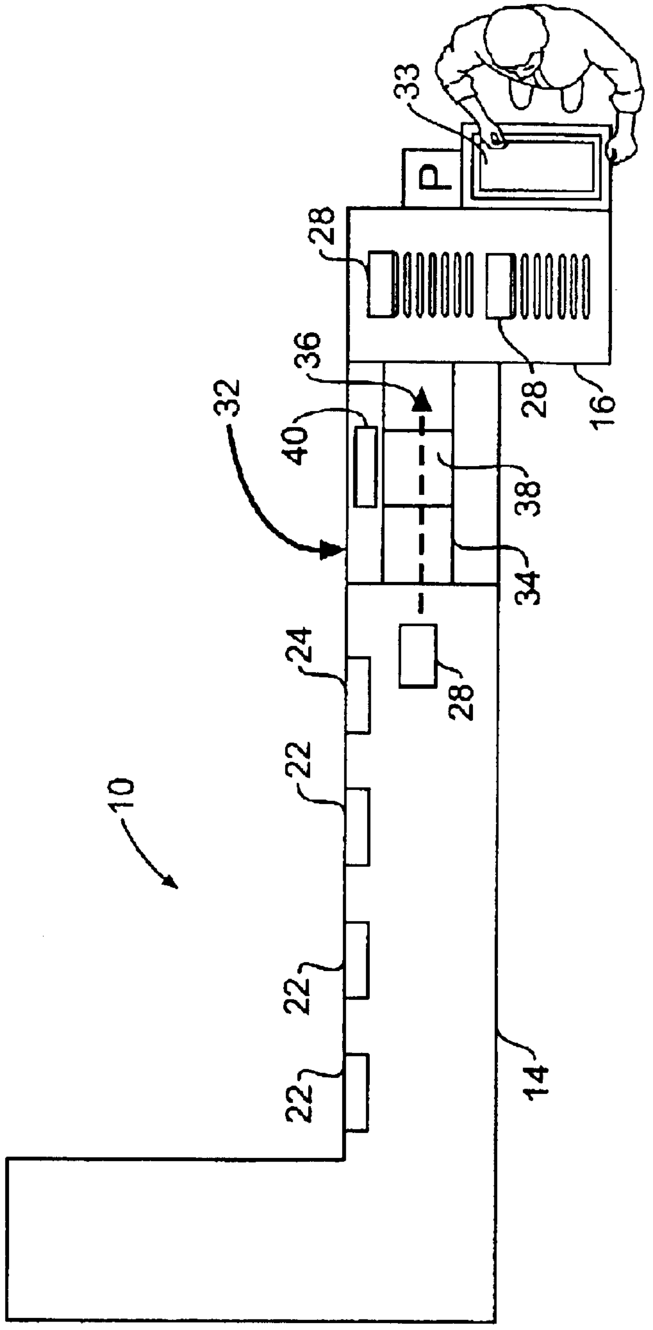
FIG. 2 is a plan schematic view of one embodiment of a mail piece inserter with the in-line image capture and scale module located at the end of the inserter, and prior to the traying conveyor.

FIG. 2 illustrates one embodiment of an inserter modified in accordance with the teachings of the present invention, where like parts have been numbered as in FIG. 1. The inserter 10 of FIG. 2 comprises an infeed conveyor section 12 and an insertion section 14 substantially as described in the prior art device shown in FIG. 1. Envelope station 24 is where the finished mail piece 28 is completed. An in-line scale and image capture module 32 is located adjacent the end of insertion section 14, and finished mail pieces 28 are sequentially transported along path 34 in the direction shown by the arrow 36. Disposed in path 34 are a scale 38 which is capable of measuring and recording the weight of each mail piece 28 as the mail piece moves, without stopping, across path 34. The scale in the illustrated embodiment is based on load cell technology, however, other suitable scales that can measure record the weight or mass of a moving mail piece may also be utilized. An example of one type of scale that can be used is disclosed in assignee's co-pending patent application Ser. No. 08/909,640, mentioned above and incorporated by reference in this application.

The module 32 also includes an image capture device 40 located adjacent transport path 34 and positioned such that the image capture device 40 can capture the image of all visible address information and postage value indicia on a face of mail piece 28. The image capture device 40 in the illustrated embodiment of the present invention is a CCD (closed couple device) camera, however, any imaging device that can capture and digitize the address information and postage value indicia on a face of mail piece 28 is suitable. An example of the type of image capture device 40 utilized in the present invention is described in assignee's co-pending patent application Ser. No. 08/909,640, incorporated by reference in this application.

The weighing and image capture module 32 also includes endorsement line and separator card detection and recognition, separator cards, multiple directories, tray and sack label barcode analysis, mail piece dimensional analysis and package label recognition. The module 32 of the present invention provides its verification and data communication functions automatically in one pass of the stream of mail pieces. The module 32 also provides a system to protect Postal Service revenue and standardize the verification process of incoming mail.

After traversing path 34, each mail piece 28 is conveyed to traying conveyor section 16 of inserter 10, where the mail pieces are placed in tray 33. While not shown in the present drawings, it is contemplated that mail pieces 28 will be automatically placed in tray 33 in a predetermined sequence, and a label attached to the tray to provide information as to the tray's contents, destination and/or validation status.

Figure 3:
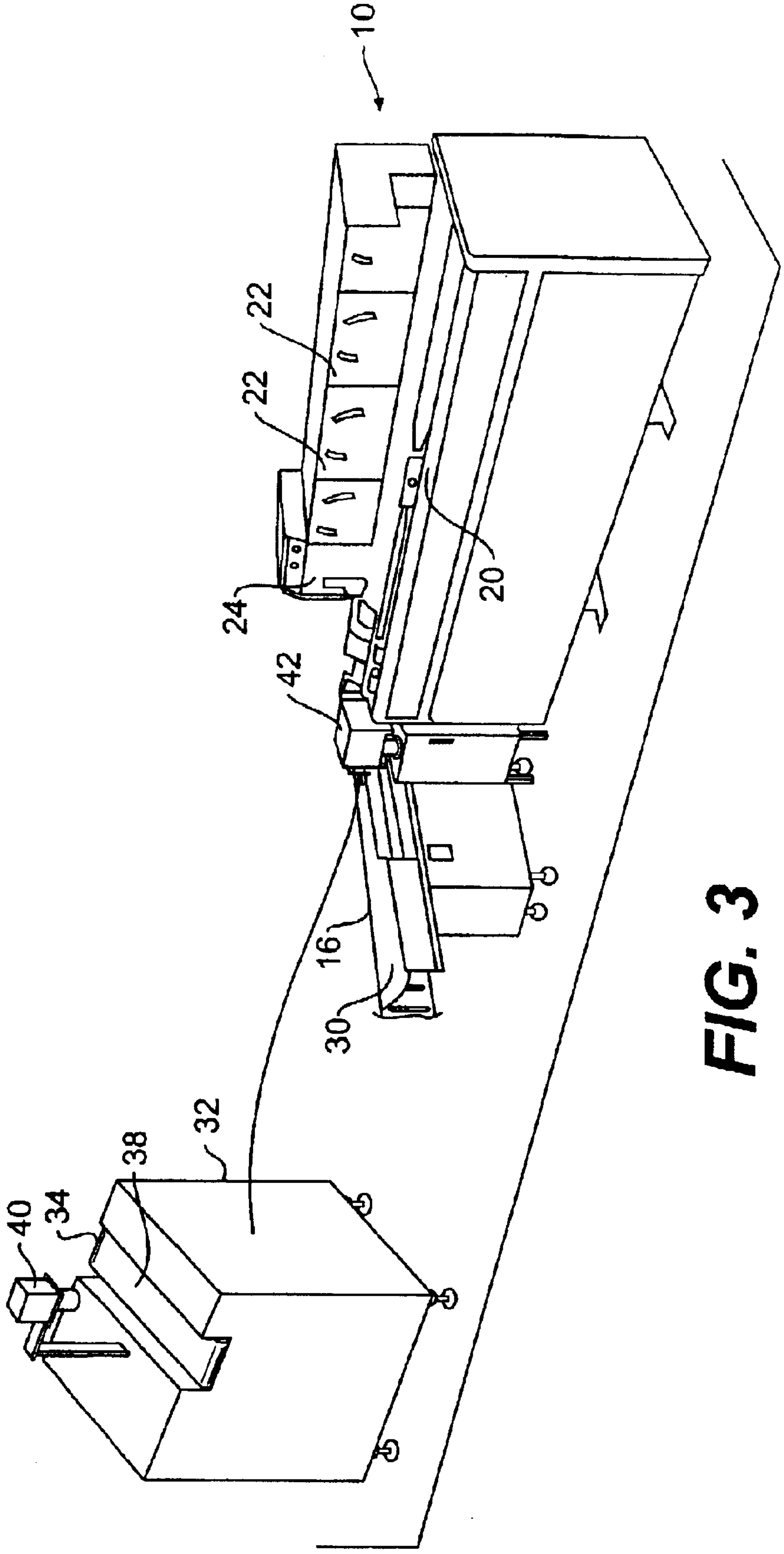
FIG. 3 is a perspective diagrammatic view of an inserter and traying apparatus, with an exploded depiction of one embodiment of an in-line scale and image capture module constructed in accordance with the teachings of the present invention.

As diagrammatically illustrated in FIG. 3, in-line scale and image capture module 32 is located between insertion section 14 and traying conveyor section 16, with path 34 of module 32 in line with insertion conveyor 20. In the schematic illustration, image capture device 40 is disposed above path 34 so as to be able to electronically capture the image of address information and postage value indicia from the face of a mail piece 28. Also shown in FIG. 3 is a location for a postage meter 42 which is programmed to apply the correct postage value to each mail piece pursuant to the established rules.

The weighing and image capture module 32 automatically conducts the following verification steps:

1) Pre-sort sort verification;
2) Short applied postage paid verification;
3) Meter verification;
4) Barcode readability and accuracy verification; and
5) Endorsement and rate markings verification.

To initiate actuation of module 32, several parameters are entered into the central computer, and the system automatically measures the information by calculating and displaying parameters such as bulk postage rate, total weight of mailing, number of sample units, error factor, percent error, and additional postage due. The module 32 is capable of handling all combinations of letter mail and flat mail.

Figure 4:
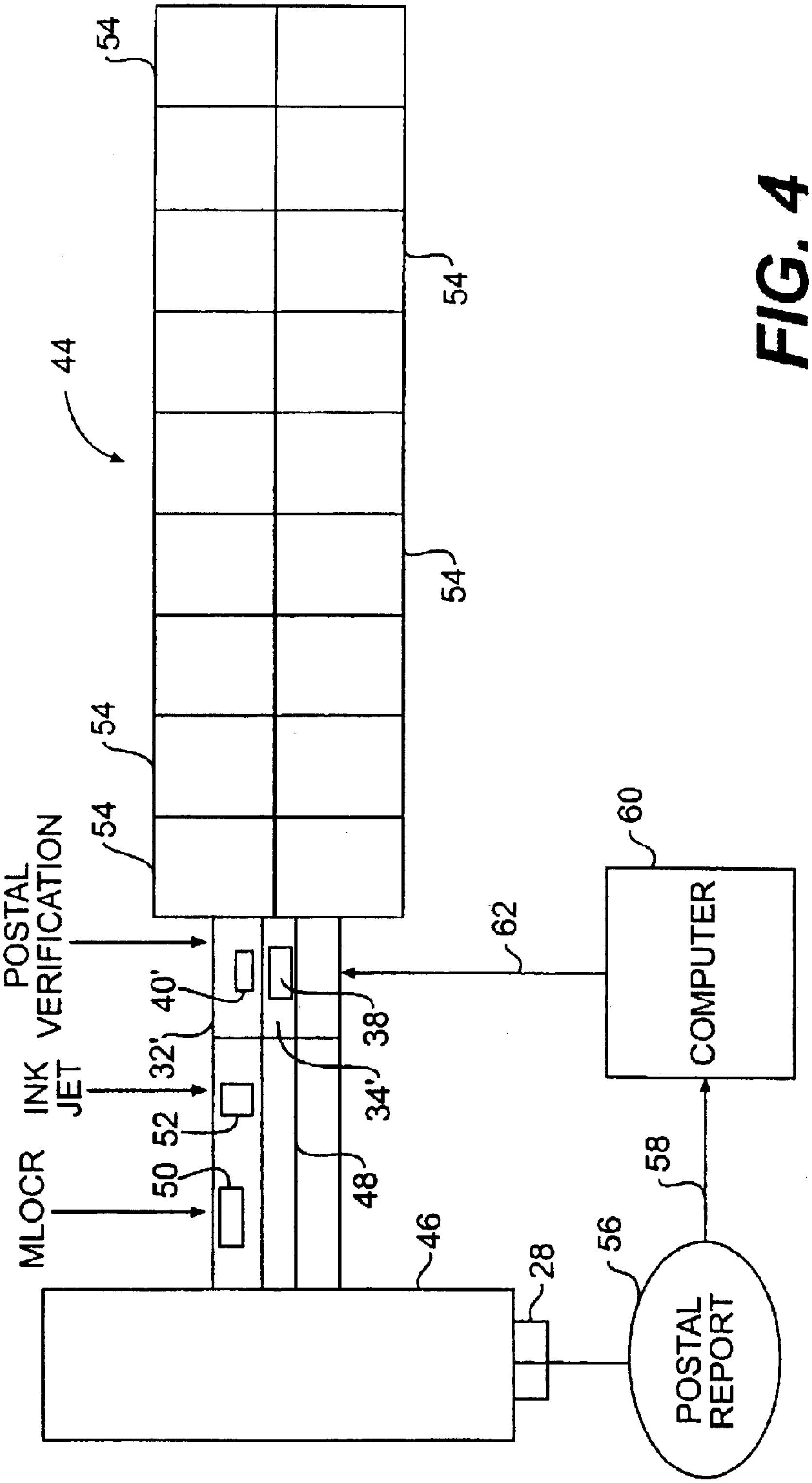
FIG. 4 is a plan schematic view of a mail piece sorter with an in-line scale and image capture module located just ahead of the sorting bins.

The present invention may also be utilized in a mailpiece sortation system, as diagrammatically shown in FIG. 4, where 44 is a sorter as is known in the art. Sorter 44 includes mail piece infeed portion 46, transport conveyor 48, optical character reader (OCR) 50, ink jet printer 52, in-line weighing and image capture module 32' and a plurality of sorting bins 54. In the illustrated embodiment of FIG. 4, information about the documents being introduced into the sorter 40 is set forth on postal report 56, and this information is transmitted electronically via link 58 to computer 60. Computer 60 is electronically linked to weighing and image capture module 32' through link 62.

Mail pieces 28 fed into sorter 44 of FIG. 4 will be conveyed along transport path 48, where OCR 50 will obtain information from a face of each envelope as to the appropriate bin 54 in which mail piece 28 is to be directed, as is known in the art. As the mail piece passes printer 52, additional barcoded or alpha-numeric information may optionally be printed on mail piece 28.

After leaving the vicinity of printer 52, mail piece 28 is advanced along path 34' of module 32' and across scale 38, where the mail piece is weighed. In addition, image capture device 40' electronically captures an image of address information, postal value indicia and other information which is visible on a face of the mail piece 28, as explained previously. This electronic information is transmitted to computer 60 which performs the verification functions necessary to qualify each piece of mail to an appropriate sorting bin. If a mail piece does not meet verification standards, it is advanced to a reject bin for further processing, and data pertaining to the rejected mail piece 28 is displayed on a screen (not shown) associated with computer 60.

Figure 5:
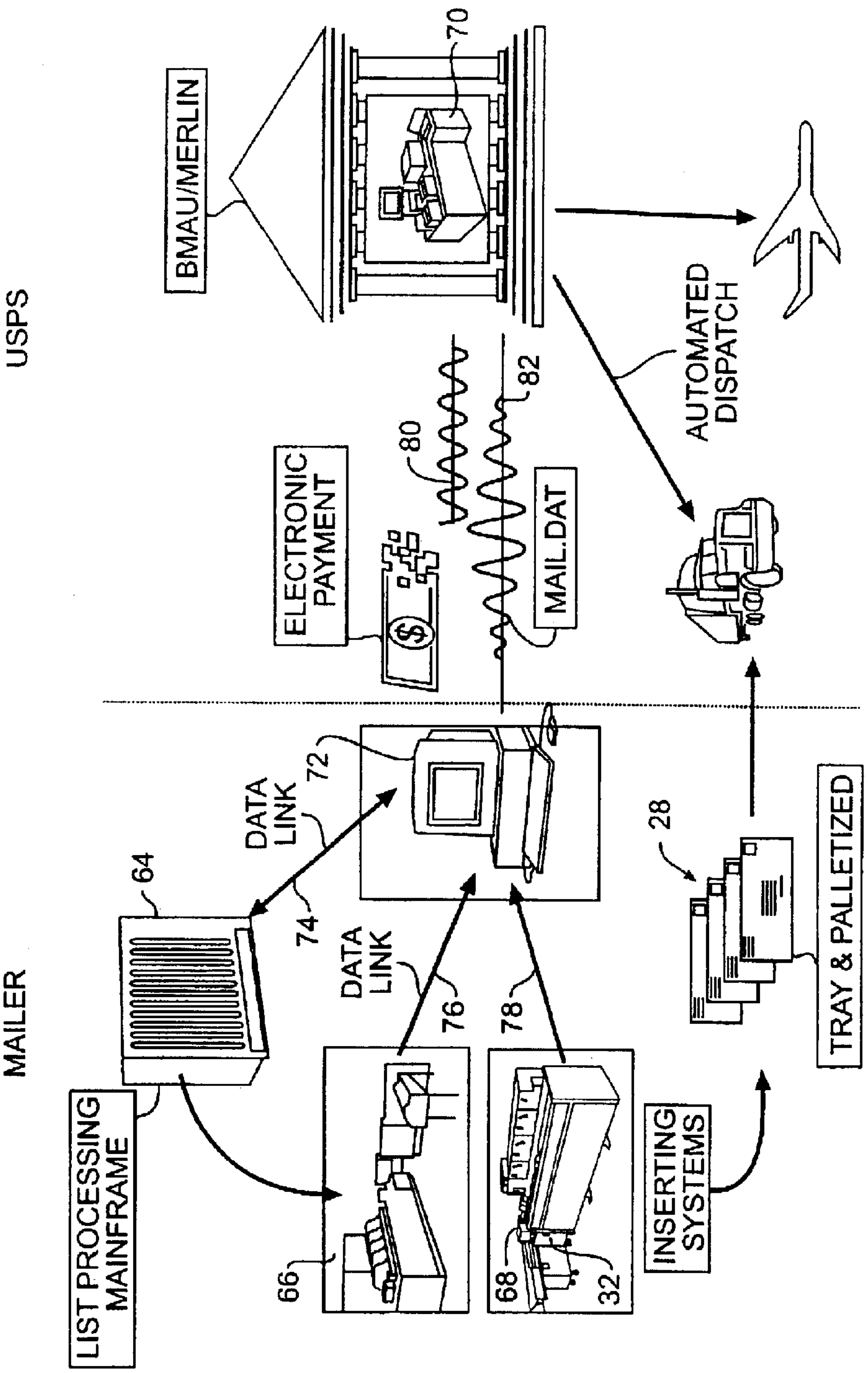
FIG. 5 is a schematic depiction of the data connections or links between a list processing mainframe, an inserter system, a data processing unit and a Postal Service facility, showing the mail data link and the electronic postage payment links between the Postal Service facility and the data processing unit.

FIG. 5 is a illustrates a recommended relationship between a mailer's list processing mainframe 64 and inserting systems 66, 68 and the Postal Service mail processing system 70, all of which are electronically linked through computer 72. Links 74, 76, 78 extend between computer 72 and mainframe 64 and inserters 66 and 68. Electronic payment link 80 and MAIL.DAT link 82 extend between computer 72 and Postal Service mail processing system 70.

In the system depicted in FIG. 5, the mailer customer has mailing list data and document generating data stored in mainframe 64, and data link 74 electronically connects the mainframe data to computer 72. The document could be an invoice or billing statement, and individual billing data may also be stored in mainframe 64. As will be explained in further detail, data from mainframe 64 is electronically transmitted to the inserter systems 66, 68 where each document 18 (FIG. 1) is generated. As described in conjunction with the embodiment of FIG. 2, the inserting systems 66, 68 include an in-line scale and image capture module 32 which provides verification of the correct address and postage on each mail piece 28, and other information, before each mail piece 28 is placed in a mail tray 33 (FIG. 2). The verification data generated by module 32 is transmitted via links 76, 78 to computer 72, and then to the Postal Service mail processing system 70 via MAIL.DAT link 82. Since verification has been completed at the mailer customer site 84, and the verification data has been automatically transmitted to the Postal Service, there is no need for further verification. As a result, the trays 33 of mail pieces are formed into pallets, each pallet comprising multiple mail trays 33. These pallets are placed on appropriate transportation means, such as truck or plane, for shipment to a local postal facility for further distribution.

Data link 80 also electronically connects Postal Service mail processing system 70 to the mailing customer's computer 72, whereby used postage value in the mailer customer's computer 72 or postage meter 42 can be automatically replaced. Simultaneously, the mailer customer's account is charged for the additional postage.

Figure 6:
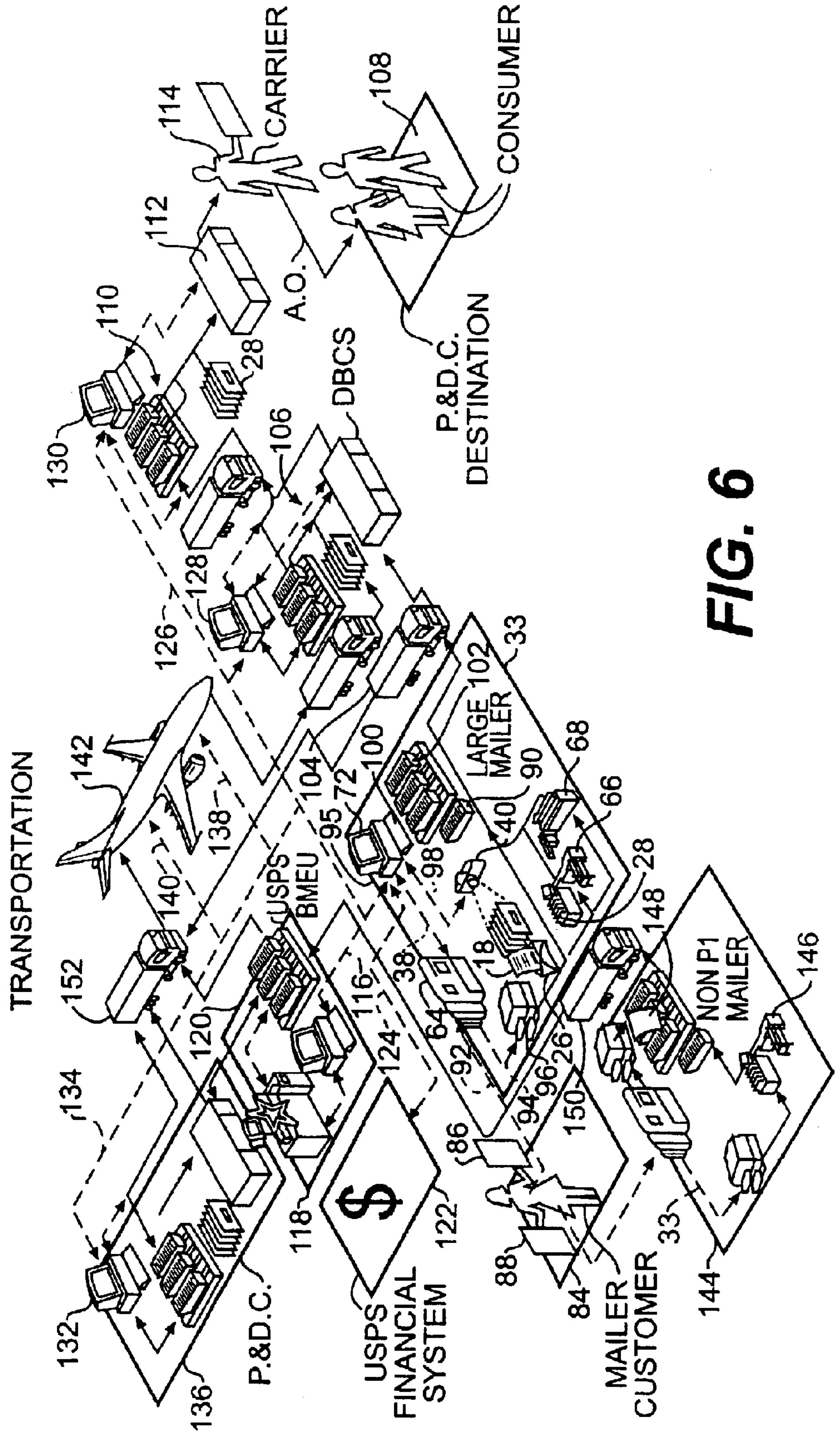
FIG. 6 is a schematic depiction of the use of an in-line scale and image capture module in a system for enhancing mail piece delivery from the creation of a mail piece to delivery of the mail piece to a consumer.

FIG. 6 describes, in schematic view, a recommended use of the in-line automatic data acquisition and verification system of the present invention. In the illustrated system, a mailer customer 84 electronically transmits document generating information 86, for example billing information if the document is an invoice, and address information 88 to mainframe 64 maintained at the facility of large mailer 90, along link 92. Both document generating information 86 and address information 88 are stored in main frame 64 at the facility of large mailer 90. Document and address information is forwarded along link 94 to document generating printer 46 where document 18 is created, with each document addressed to a different delivery point, and each document comprising billing information unique to that delivery point in the presently illustrated exemplar embodiment. An electronic data link 95 also transmits data in two directions between computer 72 and mainframe 64. Each document 18 is advanced to an inserter 10, which inserters 66, 68 place document 18 in an envelope 26, along with other insert material to be included in the envelope, including in certain cases a return envelope addressed to mailer customer 84. As stated previously, the mail piece may be imprinted with a planet code for use in outgoing mail piece tracking, or the return envelope may be imprinted with a planet code to allow tracking of payment made via the return envelope. After all documents 18 and insert material have been placed in envelope 26, the envelope is automatically sealed with the address information 88 for a designated delivery point either visible through an opening in the envelope, visible through a glassine window in the envelope, or imprinted directly on a face of envelope 26. Additionally, postage value indicia are applied to each envelope 18, which indicia is also visible on a face of the envelope.

Each finished mail piece 28, immediately after the sealing of each envelope 18, is transported across path 34 of in-line scale and image capture module 32, where each mail piece 28 is weighed by scale 38. Also, the image of the address information and postage value indicia on a face of each envelope is captured by image capture device 40, which is a CCD camera in the illustrated embodiment. Image capture device 40 and scale 38 digitize the image and weight data, respectively, and that data is transmitted via two-way link 98 to computer 72.

At inserting machines 66, 68, each mail piece is placed in a tray 33, to which a label is attached bearing machine readable information relating to the contents of each tray. A scanner (not shown) reads the data on the label attached to each tray 33, and transmits that data in digital form to computer 72 via link 100. As described above, computer 72 is now in possession of information from scale 38, image capture device 40, and the scanner (not shown) which reads the label on tray 33. The address, postage and label data is analyzed by computer 72 in the manner described in assignee's pending patent application Ser. No. 08/909,640, which among other things, verifies that the information on the tray label and the postage discounts requested are correct. In the presently illustrated embodiment, if the verification process performed by computer 72 is successful, a plurality of trays, which all have delivery points in the same area served by a regional or local Postal Service P&DC 106, are placed on a pallet 102. The pallet is labeled with an identifying bar code, placed on a properly identified truck 104, and the truck 104 delivers the pallet of mail directly from the facility 90 of the large mailer to the regional or local distribution and processing center 106.

In the illustrated example, distribution and processing center 106 may handle all mail, letter size and flat mail, destined for all mail consumers 108 having a ZIP code beginning with 604, for example. Mail is processed to a localized sorting level at processing and distribution center 106, and is then transferred to a local post office 110, for example servicing consumers having the ZIP code 60422. At local post office 110, the mail may be sorted by carrier sequence bar code sorter 112, which places each mail piece 28 in sequence pursuant to the mailperson's 114 delivery point route.

With reference to the transmission of data, as described above, computer 72 receives address, postage and tray content data from scale 38, image capture device 40 and the scanner (not shown) which reads tray label 33. This data is also transmitted electronically via link 116 to computer 118 locate at a major Postal Service bulk mail entry unit (BMEU) 120. similar data is transmitted electronically between computer 72 and a Postal System financial center 122 via link 124.

Data link 126 electronically connects computers 72 and 118 to computer 128 located at regional D&PC 106, and with computer 130 at local post office 110. Data link 126 is also electronically connected to computer 132 via link 134, and computer 132 is located at a central Postal Service processing and distribution center 136. Links 138, 140 also electronically connects to link 134 and 126, which electronically connects the data stream represented by link 126 and computers 72, 118, 128, 130 and 132. Data links 138, 140 also connect to computers (not shown) which collect information relating to aircraft 142, which delivers mail between major Postal Service facilities for ultimate distribution to consumers 108.

The electronic linking between computers 72, 118, 128, 130 and 132 provides data from computer 72, which computer verifies the correctness of the address and postage on each mail piece, and makes that data available to other data processing units along the chain of distribution of the mail pieces. This permits tracking of the location of each mail piece by ascertaining the time when a mail piece reaches or leaves a specific Postal Service facility, or leaves a large mailer facility. Additionally, the electronic network described above allows the electronic reporting of postage income paid to the Postal Service, and for postage usage to be reported upon the creation of a mail piece. Further, the networking of all the facilities in the mail distribution chain allows the status of each bulk mailing to be reported, which also permits efficient planning of transportation equipment, such as aircraft and trucks. Since the mail pieces 28 are transported directly from the large mailer facility 90 directly to regional or local postal facilities, without first being processed for verification at a large central D&PC 136, mail can be shipped earlier by truck, rather than being shipped by air, which is significantly more expensive. The present system contemplates electronic links over a secured Internet facility, or a Postal system dedicated intranet network. This enables a large mailer, or a mailer customer, to access data relating to its own mail shipments, and to track the processing and delivery of each mail piece to the consumer. The use of planet codes will also enable the mailer customer to be furnished information showing the date of payment of an invoice using a return envelope, when that envelope reaches the first stage of the sortation and delivery process.

Referring again to FIG. 6, if the mailer customer 84 sends a bulk mail processing project to a facility 144 that does not have an in-line scale and image capture module 32, in association with an inserter 146, and the linking electronic network described above is also missing, the bulk mail is processed as in the prior art by inserter 146, the mail is tread, labels are applied to the trays 33, appropriate Postal System reports 148 are prepared, and the trays and their contents are palletized. The pallets are then loaded on truck 150. Since there has been no prior verification of the sortation quality, postage payments, and other items at the facility 144, the mail on truck 150 must be taken to the Postal Services BMEU 120 for application of verification procedures. Once verified, bulk mail in trays and pallets is placed on truck 152 for further distribution.

The presently disclosed invention provides a unique system for the automated electronic verification of address and postage information on each mail piece in a bulk mail shipment at the point where the mail piece is created. When this verification system is used by a bulk mailer, the verification data is furnished directly to the Postal Service, and the bulk mail shipment can be advanced to the next point in the mail distribution chain without further verification. This saves time and costs, leading to increased efficiency in delivery times. In addition, the present system permits a mailer customer to track mail through the distribution system, and also allows a mass mailer to replace used postage automatically from the Postal Service.

What is claimed is:

1. An apparatus for acquiring and verifying, relative to pre-established rules, mail piece information for a plurality of mail pieces, comprising:

a mail processing machine adapted to process the mail pieces;

a module disposed in-line with the mail processing machine, said module including a path along which the mail piece is transported; and at least one of a device adapted to determine mail piece information relating to physical characteristics of each mail piece and a device adapted to capture an image of mail piece information on a face of each mail piece; and at least one processor device linked to the at least one of a device adapted to determine mail piece information relating to physical characteristics of each mail piece and a device adapted to capture an image of mail piece information on a face of each mail piece, the at least one processor device for controlling acquisition and verification of the mail piece information for each mail piece.

2. The apparatus of claim 1 wherein the mail processing machine is a machine which creates a batch of mail pieces.

3. The apparatus of claim 2 wherein the machine which creates a batch of mail pieces is an inserter or a sorter.

4. The apparatus of claim 1 wherein the device adapted to determine mail piece information relating to physical characteristics of each mail piece comprises a scale.

5. The apparatus of claim 1 wherein the device adapted to capture an image of mail piece information on a face of each mail piece comprises a camera.

6. The apparatus of claim 1 wherein the mail piece information relating to physical characteristics of each mail piece includes at least one of height, length, width and weight.

7. The apparatus of claim 1 wherein the mail piece information on a face of each mail piece includes at least one of destination information, postage paid information, presort category information, and carrier route information.

8. The apparatus of claim 7 wherein the destination information includes at least one of address information and barcode information.

9. The apparatus of claim 7 the postage paid information includes at least one of stamp, meter and permit.

10. The apparatus of claim 1, wherein the at least one processor device generates a report indicating that the plurality of mail pieces are acceptable or not acceptable, in whole or in part.

11. A method for acquiring and verifying, relative to pre-established rules, mail piece information for a plurality of mail pieces, the method comprising the steps of:

processing each mail piece via a mail processing machine;

transporting each mail piece along a transport path associated with the mail processing machine;

as each mail piece is transported along the path, determining mail piece information relating to at least one of physical characteristics of each mail piece and information on a face of each mail piece; and controlling acquisition and verification of the mail piece information for each mail piece.

12. The method of claim 11 wherein the mail processing machine creates a batch of mail pieces.

13. The method of claim 12 wherein the mail processing machine is an inserter or a sorter.

14. The method of claim 11 wherein the step of determining mail piece information relating to at least one of physical characteristics of each mail piece and information on a face of each mail piece includes the step of weighing each mail piece.

15. The method of claim 11 wherein the step of determining mail piece information relating to at least one of physical characteristics of each mail piece and information on a face of each mail piece includes the step of capturing an image of each mail piece.

16. The method of claim 11 wherein the mail piece information relating to physical characteristics of each mail piece includes at least one of height, length, width and weight.

17. The method of claim 11 wherein the mail piece information on a face of each mail piece includes at least one of destination information, postage paid information, presort category information, and carrier route information.

18. The method of claim 17 wherein the destination information includes at least one of address information and barcode information.

19. The method of claim 17 wherein the postage paid information includes at least one of stamp, meter and permit.

20. The method of claim 11, further comprising the step of generating a report indicating that the plurality of mail pieces are acceptable or not acceptable, in whole or in part.

* * * * *

UNITED STATES PATENT AND TRADEMARK OFFICE

CERTIFICATE OF CORRECTION

PATENT NO. : 6,793,136 B2
APPLICATION NO. : 10/351409
DATED : September 21, 2004
INVENTOR(S) : Thomas R. Wells et al.

It is certified that error appears in the above-identified patent and that said Letters Patent is hereby corrected as shown below:

On the title page of the patent, under section "(73) Assignee", please change "Bell Bowe & Howell Postal Systems" to --Böwe Bell & Howell Postal Systems--.

Signed and Sealed this

Sixteenth Day of November, 2010

David J. Kappos
*Director of the United States Patent and Trademark Office*